United States Patent
Fang et al.

(10) Patent No.: US 10,466,846 B2
(45) Date of Patent: Nov. 5, 2019

(54) TOUCH SUBSTRATE AND MANUFACTURING METHOD THEREOF, AND DISPLAY DEVICE

(71) Applicants: BOE Technology Group Co., Ltd., Beijing (CN); Hefei Xinsheng Optoelectronics Technology Co., Ltd., Hefei (CN)

(72) Inventors: Zhixiang Fang, Beijing (CN); Ming Hu, Beijing (CN); Dayu Zhang, Beijing (CN); Rikun Jiang, Beijing (CN)

(73) Assignees: BOE Technology Group Co., Ltd., Beijing (CN); Hefei Xinsheng Optoelectronics Technology Co., Ltd., Hefei (CN)

( * ) Notice: Subject to any disclaimer, the term of this patent is extended or adjusted under 35 U.S.C. 154(b) by 0 days.

(21) Appl. No.: 15/517,621

(22) PCT Filed: Feb. 3, 2016

(86) PCT No.: PCT/CN2016/073284
§ 371 (c)(1),
(2) Date: Apr. 7, 2017

(87) PCT Pub. No.: WO2017/045342
PCT Pub. Date: Mar. 23, 2017

(65) Prior Publication Data
US 2017/0308202 A1    Oct. 26, 2017

(30) Foreign Application Priority Data
Sep. 18, 2015   (CN) .......................... 2015 1 0597496

(51) Int. Cl.
*G06F 3/041* (2006.01)
*G06F 3/045* (2006.01)
(Continued)

(52) U.S. Cl.
CPC ............ *G06F 3/044* (2013.01); *G02F 1/0316* (2013.01); *G02F 1/13338* (2013.01);
(Continued)

(58) Field of Classification Search
CPC ....... G06F 3/044; G06F 3/0412; G06F 3/0416
See application file for complete search history.

(56) References Cited

U.S. PATENT DOCUMENTS

| | | | |
|---|---|---|---|
| 2010/0182275 A1* | 7/2010 | Saitou | G06F 3/044 345/174 |
| 2011/0193801 A1* | 8/2011 | Jung | G06F 3/0412 345/173 |

(Continued)

FOREIGN PATENT DOCUMENTS

| | | |
|---|---|---|
| CN | 101546241 A | 9/2009 |
| CN | 101546242 A | 9/2009 |

(Continued)

OTHER PUBLICATIONS

May 30, 2016—(WO) International Search Report and Written Opinion Appn PCT/CN2016/073284 with English Tran.

(Continued)

*Primary Examiner* — Nan-Ying Yang
(74) *Attorney, Agent, or Firm* — Banner & Witcoff, Ltd.

(57) ABSTRACT

A touch substrate and a manufacturing method thereof, and a display device are provided. The touch substrate includes: a first touch electrode, a second touch electrode, and a first wire; the first touch electrode extending from a first side edge of a touch region to a second side edge thereof; the second touch electrode extending from a third side edge of the touch region to a fourth side edge thereof; the first wire extending within the touch region after being electrically connected to either the first touch electrode or the second (Continued)

touch electrode, and extending from the fourth side edge to a wiring region located at the fourth side edge.

15 Claims, 5 Drawing Sheets

(51) Int. Cl.
 *G06F 3/044* (2006.01)
 *G02F 1/03* (2006.01)
 *G02F 1/1333* (2006.01)
(52) U.S. Cl.
 CPC .......... *G06F 3/0412* (2013.01); *G06F 3/0416* (2013.01); *G06F 2203/04103* (2013.01)

(56) References Cited

U.S. PATENT DOCUMENTS

| | | | |
|---|---|---|---|
| 2012/0075218 A1 | 3/2012 | Lin et al. | |
| 2013/0027291 A1 | 1/2013 | Ding et al. | |
| 2013/0155059 A1 | 6/2013 | Wang et al. | |
| 2013/0257786 A1* | 10/2013 | Brown | G06F 3/044 345/174 |
| 2014/0132534 A1* | 5/2014 | Kim | G06F 3/0412 345/173 |
| 2014/0313437 A1 | 10/2014 | Huang | |
| 2014/0346027 A1 | 11/2014 | Li et al. | |
| 2015/0212632 A1 | 7/2015 | Wang et al. | |
| 2016/0011687 A1 | 1/2016 | Ding et al. | |
| 2016/0162070 A1 | 6/2016 | He et al. | |
| 2016/0291775 A1 | 10/2016 | Li et al. | |
| 2017/0024060 A1 | 1/2017 | Seong et al. | |
| 2017/0153731 A1 | 6/2017 | Liu et al. | |

FOREIGN PATENT DOCUMENTS

| | | |
|---|---|---|
| CN | 103164071 A | 6/2013 |
| CN | 103472963 A | 12/2013 |
| CN | 104182072 A | 12/2014 |
| CN | 104407758 A | 3/2015 |
| CN | 204203935 U | 3/2015 |
| CN | 204242157 U | 4/2015 |
| CN | 104698702 A | 6/2015 |
| CN | 104793803 A | 7/2015 |
| CN | 104808832 A | 7/2015 |
| CN | 105204683 A | 12/2015 |
| CN | 204965393 U | 1/2016 |
| TW | N1364913 U | 9/2009 |
| WO | 2015137643 A1 | 9/2015 |

OTHER PUBLICATIONS

Jul. 31, 2017—(CN) First Office Action Appn 201510597496.X with English Tran.

Apr. 23, 2019—(EP) Extended European Search Report Appn 16845460.1.

* cited by examiner

US 10,466,846 B2

TOUCH SUBSTRATE AND MANUFACTURING METHOD THEREOF, AND DISPLAY DEVICE

The application is a U.S. National Phase Entry of International Application No. PCT/CN2016/073284 filed on Feb. 3, 2016, designating the United States of America and claiming priority to Chinese Patent Application No. 201510597496.X filed on Sep. 18, 2015. The present application claims priority to and the benefit of the above-identified applications and the above-identified applications are incorporated by reference herein in their entirety.

TECHNICAL FIELD

At least one embodiment of the present disclosure relates to a touch substrate and a manufacturing method thereof, and a display device.

BACKGROUND

Along with rapid development of a display technology, a touch screen has been gradually popularized in life of people. A capacitive touch screen is widely applied due to the advantages of high sensitivity, long service life, high light transmittance and the like.

A One Glass Solution (OGS) touch screen and an on cell touch screen are two relatively common touch screens. The OGS touch screen is formed by arranging a touch structure on a protection substrate outside a display panel to separately form a touch substrate and then attaching the touch substrate to the display panel. In the on cell touch screen, a touch structure is arranged on a surface of a side of an opposed substrate (e.g., a color filter substrate), which faces away an array substrate, in a display panel.

SUMMARY

At least one embodiment of the disclosure provides a touch substrate and a manufacturing method thereof, and a display device, used for implement narrow frame or frame-free design.

At least one embodiment of the disclosure provides a touch substrate, having a touch region and a wiring region outside the touch region, and comprising: a first touch electrode arranged in the touch region, wherein the first touch electrode extends from a first side edge of the touch region to a second side edge of the touch region along a first direction; a second touch electrode arranged in the touch region, wherein the second touch electrode extends from a third side edge of the touch region to a fourth side edge of the touch region along a second direction, the second direction intersects with the first direction, and the wiring region is positioned at the fourth side edge of the touch region; a first wire, electrically connected with one of the first touch electrode and the second touch electrode, wherein the first wire extends to the fourth side edge of the touch region in the touch region from a position connected with the one of the first touch electrode and the second touch electrode, and extends to the wiring region from the fourth side edge; and a first insulating layer, at least arranged in the touch region, wherein along a direction perpendicular to a plane where the first insulating layer is located, the first touch electrode and the second touch electrode are arranged on a first side of the first insulating layer, the first wire is arranged on a second side of the first insulating layer, and the second side is opposite to the first side.

At least one embodiment of the disclosure provides a display device including the touch substrate as mentioned above.

At least one embodiment of the disclosure provides a manufacturing method of a touch substrate, wherein the touch substrate has a touch region and a wiring region outside the touch region, the method comprising: forming a first touch electrode and a second touch electrode in the touch region, wherein the first touch electrode extends from a first side edge of the touch region to a second side edge of the touch region along a first direction, the second touch electrode extends from a third side edge of the touch region to a fourth side edge of the touch region along a second direction, the second direction intersects with the first direction, and the wiring region is positioned at the fourth side edge of the touch region; forming a wire electrically connected with one of the first touch electrode and the second touch electrode, wherein the wire extends to the fourth side edge of the touch region in the touch region from a position connected with the one of the first touch electrode and the second touch electrode, and extends to the wiring region from the fourth side edge; and forming a first insulating layer at least in the touch region between forming the first touch electrode and the second touch electrode and forming the wire, wherein along a direction perpendicular to a plane where the first insulating layer is located, the first touch electrode and the second touch electrode are formed on a first side of the first insulating layer, the wire is formed on a second side of the first insulating layer, and the second side is opposite to the first side.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

FIG. 1b is a section-view schematic diagram along an AA line in FIG. 1a;

FIG. 2c is a section-view schematic diagram of a touch substrate provided by an embodiment of the present disclosure along a BB line in FIG. 2a;

DETAILED DESCRIPTION

In order to make objects, technical details and advantages of the embodiments of the disclosure apparent, the technical solutions of the embodiment will be described in a clearly and fully understandable way in connection with the drawings related to the embodiments of the disclosure. It is obvious that the described embodiments are just a part but not all of the embodiments of the disclosure. Based on the described embodiments herein, those skilled in the art can obtain other embodiment(s), without any inventive work, which should be within the scope of the disclosure.

Unless otherwise defined, the technical terms or scientific terms here should be of general meaning as understood by those ordinarily skilled in the art. In the present disclosure, words such as "first", "second" and the like do not denote any order, quantity, or importance, but rather are used for distinguishing different components. Similarly, words such as "a", "a/an" or "the" or the like do not denote quantitative limitation, but rather indicate there is at least one. Words such as "include" or "comprise" and the like denote that elements or objects appearing before the words of "include" or "comprise" cover the elements or the objects enumerated after the words of "include" or "comprise" or equivalents thereof, not exclusive of other elements or objects. Words such as "connected" or "connecting" and the like are not limited to physical or mechanical connections, but may include electrical connection, either direct or indirect. Words such as "up", "down", "left", "right" and the like are only used for expressing relative positional relationship, when the absolute position of a described object is changed, the relative positional relationship may also be correspondingly changed.

Figure 1A:
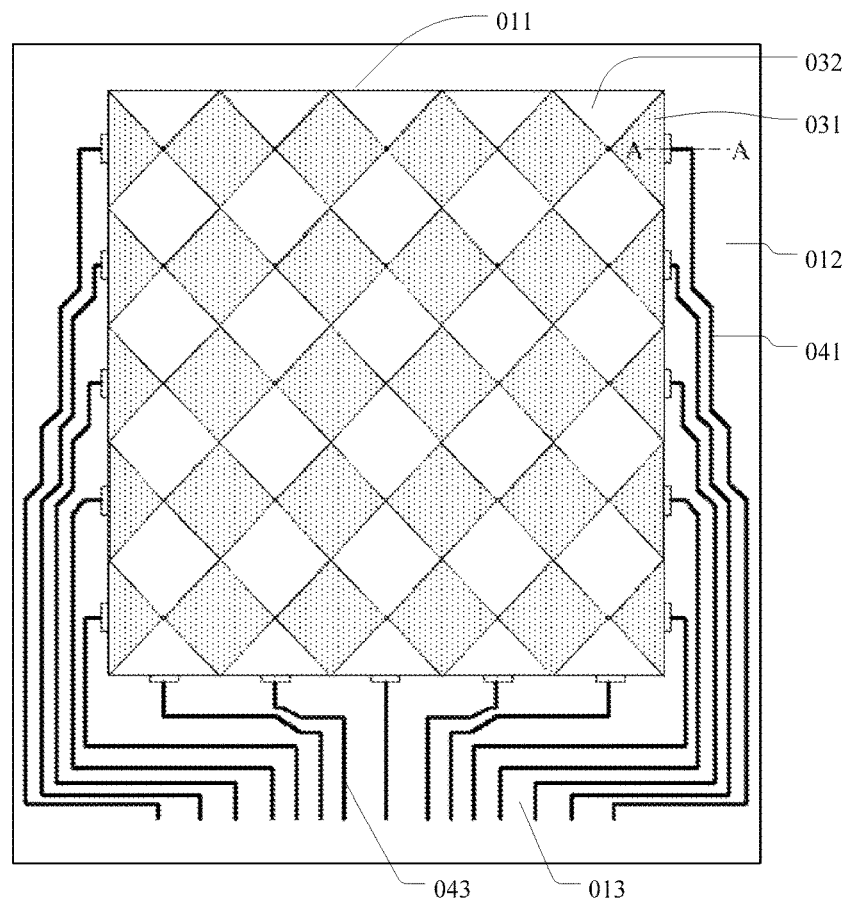
FIG. 1a is a top-view schematic diagram of an OGS touch screen.

FIG. 1a is a top-view schematic diagram of an OGS touch screen. As illustrated in FIG. 1a, the touch screen includes a plurality of first touch electrodes 031 arranged sequentially and a plurality of second touch electrodes 032 arranged sequentially, which are arranged in a touch region 011; each first touch electrode 031 extends transversely, and each second touch electrode 032 extends longitudinally. The touch screen further includes a wire 041 electrically connected with the first touch electrode 031 and a wire 043 electrically connected with the second touch electrode 032. After being electrically connected with the first touch electrode 031, the wire 041 is led out to a nearest region 012 where a side frame is positioned (referred to as a "side frame region" hereinafter), and extends to a bonding pad region 013 (a region where a lower frame of the touch screen in FIG. 1a is positioned) of the touch screen so as to implement electrical connection between the first touch electrode 031 and a touch chip (not illustrated in FIG. 1a); and after being electrically connected with a lower end of the second touch electrode 032, the wire 043 is directly led out to the bonding pad region 013 of the touch screen.

Figure 1B:
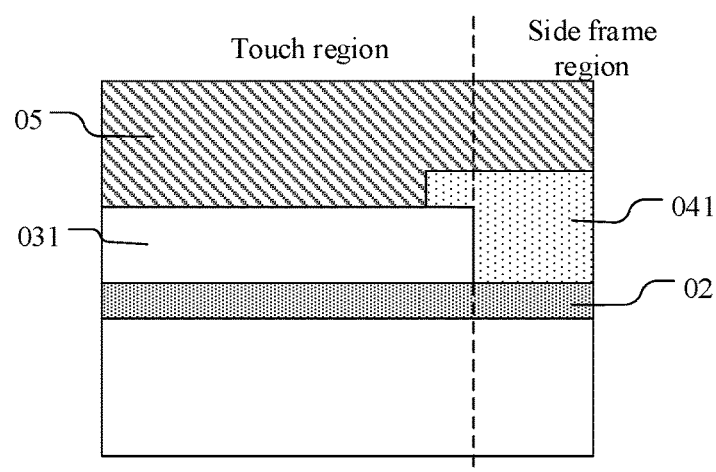

FIG. 1b is a section-view schematic diagram along an AA line in FIG. 1a. As illustrated in FIG. 1b, after being electrically connected with the first touch electrode 031, the wire 041 extends towards a direction away from the first touch electrode 031, i.e., extends towards the side frame region. In addition, in the touch screen illustrated in FIG. 1b, a black matrix 02 is further arranged near the side frame region in order to avoid influence of the wire 041 in the side frame region on a visual effect, and an insulating layer 05 is arranged on the wire 041 so as to protect the wire 041.

In the research, inventors of the application note that in cases illustrated in FIG. 1a and FIG. 1b, the wire 041 which the OGS touch screen includes is arranged outside the touch region 011 and needs to be led into the bonding pad region after passing through the side frame region, resulting in that frame-free touch panel in the true sense cannot be implemented, so that no frame display cannot be implemented.

Figure 2A:
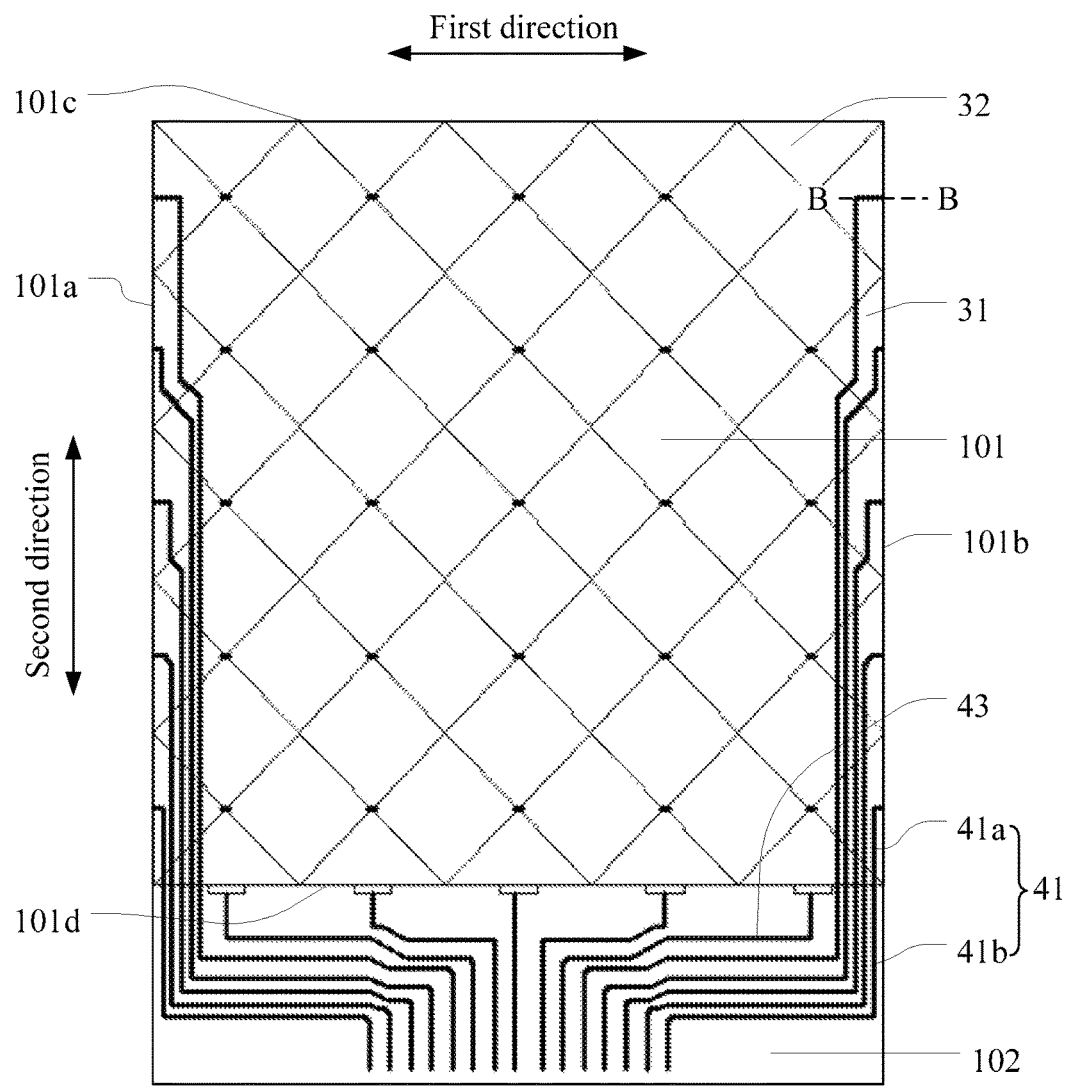
FIG. 2a is a top-view schematic diagram of a touch substrate provided by an embodiment of the present disclosure.
Figure 2B:
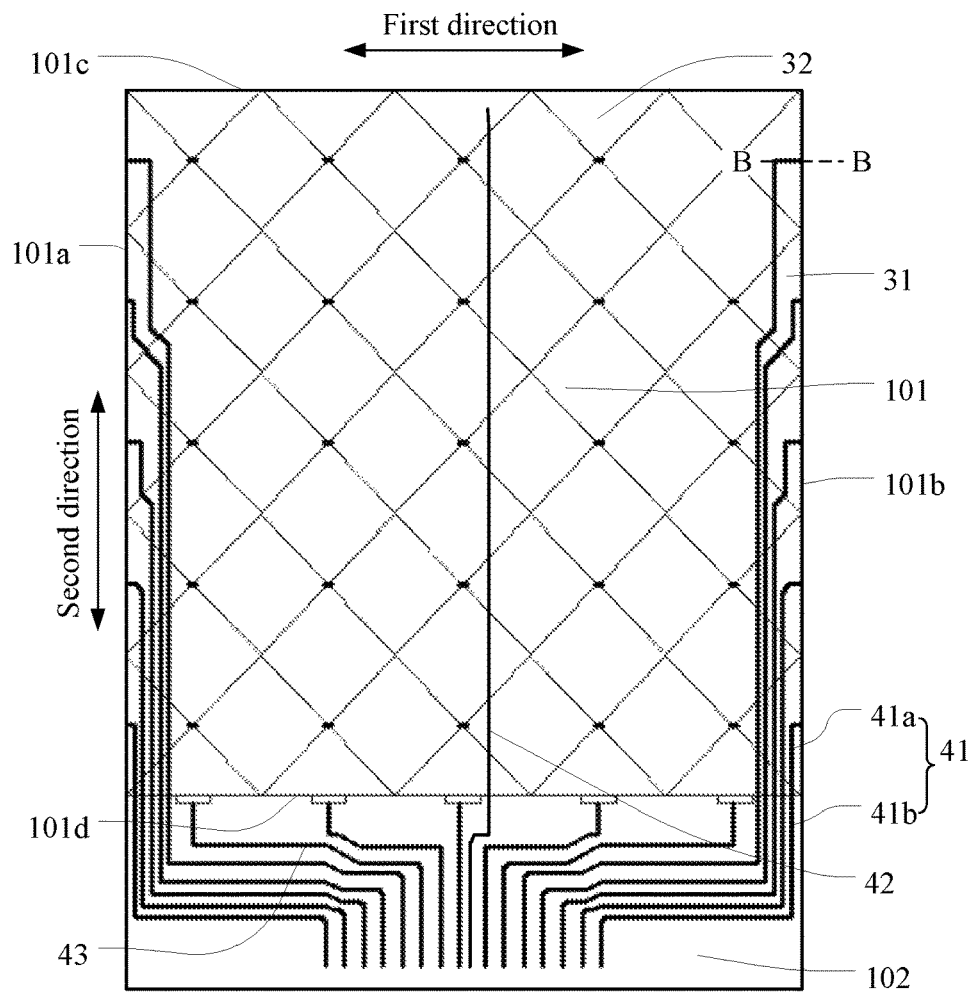
FIG. 2b is a top-view schematic diagram of a touch substrate provided by an embodiment of the present disclosure.
Figure 2C:
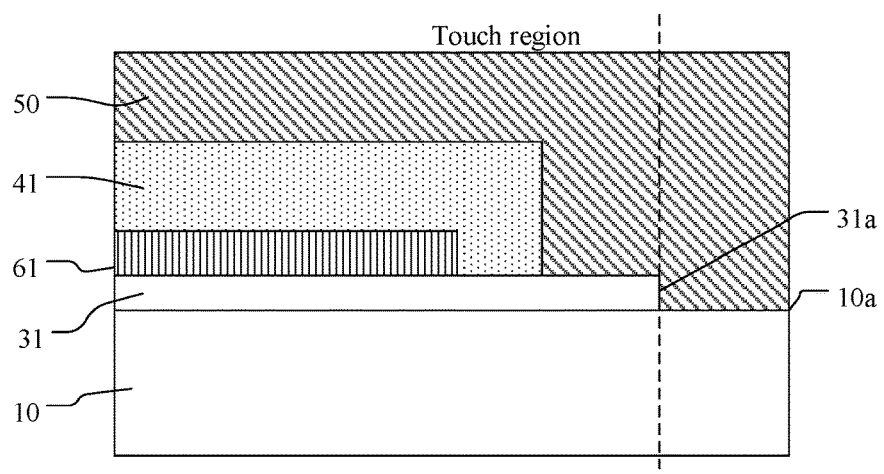

At least one embodiment of the present disclosure provides a touch substrate. As illustrated in FIG. 2a to FIG. 2c, the touch substrate has a touch region 101 and a wiring region 102 positioned outside the touch region 101, and includes a first touch electrode 31 and a second touch electrode 32 which are arranged in the touch region 101, a first wire 41 which is arranged in the touch region 101 and the wiring region 102 and is electrically connected with one of the first touch electrode 31 and the second touch electrode 32, and a first insulating layer 61 at least arranged in the touch region 101. In the touch substrate, the first touch electrode 31 extends from a first side edge 101a of the touch region 101 to a second side edge 101b of the touch region 101 along a first direction; the second touch electrode 32 extends from a third side edge 101c of the touch region 101 to a fourth side edge 101d of the touch region 101 along a second direction, the second direction intersects with the first direction, and the wiring region 102 is positioned at the fourth side edge 101d of the touch region 101; and the first wire 41 extends to the fourth side edge 101d of the touch region 101 from a position connected with one of the first touch electrode 31 and the second touch electrode 32 in the touch region 101, and extends to the wiring region 102 from the fourth side edge 101d, i.e., the first wire 41 includes a first portion 41a arranged in the touch region 101 and a second portion 41b arranged in the wiring region 102, which are electrically connected with each other. Along a direction perpendicular to a plane where the first insulating layer 61 is located, the first touch electrode 31 and the second touch electrode 32 are arranged on a first side of the first insulating layer 61, the first wire 41 is arranged on a second side of the first insulating layer 61, and the second side is opposite to the first side. In some embodiments, the first direction and the second direction are perpendicular to each other.

In the embodiment of the present disclosure, the wiring region 102 is a bonding pad region of the touch substrate, and for example, a pin (not illustrated in the drawings) can be arranged in the bonding pad region, and the first wire 41 can be electrically connected with a flexible printed circuit board by the pin so as to be electrically connected with a touch chip.

An end portion (a bottom end of the second touch electrode 32 in FIG. 2a and FIG. 2b) of the second touch electrode 32 is closer to the wiring region 102, and thus, the second touch electrode 32 can be electrically connected with a wiring region wire 43, the wiring region wire 43 is directly led out to the wiring region 102 without passing through the touch region 101 after being electrically connected with the end portion of the second touch electrode 32, i.e., the wiring region wire 43 is electrically connected with the second touch electrode 32 at the fourth side edge 101d and extends to the wiring region 102 from the fourth side edge 101d.

In FIG. 2a, both ends of the first touch electrode 31 are respectively and electrically connected with the first wire 41, so that impedance of the first touch electrode 31 can be reduced. Certainly, the embodiments of the invention include, but are not limited thereto. For example, the first touch electrode 31 can be electrically connected with one first wire 41.

For example, as illustrated in FIG. 2b, in a case that the first wire 41 is electrically connected with one of the first touch electrode 31 and the second touch electrode 32, the touch substrate provided by at least one embodiment of the present disclosure further can include a second wire 42, the second wire 42 is electrically connected with the other one of the first touch electrode 31 and the second touch electrode 32, and the second wire 42 extends to the fourth side edge 101d of the touch region 101 from a position connected with the other one of the first touch electrode 31 and the second touch electrode 32 in the touch region 101, and extends to the wiring region 102 from the fourth side edge 101d. In the embodiment of the present disclosure, the second wire 42 extends into the wiring region 102 in the touch region 101, which is beneficial for implementing narrow frame or frame-free design of the touch substrate at a position of the third side edge 101c of the touch region. Moreover, as illustrated in FIG. 2b, one end of the second touch electrode 32 is electrically connected with the second wire 42, and the other end of the second touch electrode 32 is electrically connected with the wiring region wire 43, so that impedance of the second touch electrode 32 can be reduced.

FIG. 2b only illustrates one second wire 42, and certainly, each of the other second touch electrodes 32 can also be connected with one second wire 42.

According to the touch substrate provided by the embodiment of the present disclosure, by arranging the first wire 41 electrically connected with the first touch electrode 31 or the second touch electrode 32 in the touch region 101 and enabling the first wire 41 to be directly led into the wiring region 102 from the touch region 101 without passing through the side frame region, narrow frame or frame-free touch panel design can be implemented so as to benefit for implementing frame-free display.

For example, as illustrated in FIG. 2a, the touch substrate can implement frame-free design along the first direction, i.e., along the first direction, a size of the touch substrate may be approximately equal to a distance between the first side edge 101a and the second side edge 101b. It should be noted that due to factors of a manufacturing process or a case that the first wire 41 is electrically connected with the first touch electrode 31 or the second touch electrode 32 by a pad (a size of the pad is relatively small) and the like, the size of the touch substrate may be approximately equal to the distance between the first side edge 101a and the second side edge 101b.

The touch substrate provided by the embodiment of the present disclosure can be applied to the OGS touch screen, i.e., in a display device, and the touch substrate is arranged outside a display panel; or, the touch substrate provided by the embodiment of the present disclosure can also be applied to an on cell touch screen, i.e., the display device includes an array substrate and an opposed substrate which are arranged oppositely, the touch substrate can be used as the opposed substrate, and the first touch electrode, the second touch electrode and the first wire are arranged on a side of the opposed substrate, which faces away from the array substrate.

For example, a material of the first insulating layer 61 can include an inorganic material, e.g., at least one of materials of SiNxOy (silicon oxynitride), $SiO_2$ (silicon dioxide), or the like. Therefore, the first insulating layer 61 can be formed by silk-screen printing or a similar mode without using a photoetching process which adopts a mask, so that production cost can be effectively reduced.

For example, the first wire 41 can be made of a metal material, e.g., at least one of metals of copper, aluminium, magnesium, zirconium, titanium, lead, or the like. For example, the first wire 41 can be in direct contact with the first touch electrode 31 or the second touch electrode 32. Certainly, the first wire 41 can also be electrically connected with the first touch electrode 31 or the second touch electrode 32 by a pad (a rectangular small block at the lower end of the second touch electrode 32 as illustrated in FIG. 2a and FIG. 2b).

It can be seen from FIG. 2c that the first wire 41 is positioned in the touch region and is not arranged between an end portion 31a of the first touch electrode 31 and an edge 10a of a base substrate 10, which is close to the end portion 31a, and thus, a gap between the end portion 31a of the first touch electrode 31 and the edge 10a of the base substrate 10 can be made smaller, and along the first direction, a black matrix may not be arranged on the base substrate 10, so that narrow frame or frame-free design can be implemented.

In FIG. 2c, a protective layer 50 for protecting the first wire 41 can be further arranged on the first wire 41; and positions of the first wire 41 and the first touch electrode 31 can be interchanged. In addition, a connection relationship of the second touch electrode 32 and the second wire 42 is similar with that of the first touch electrode 31 and the first wire 41, and is not repeated herein.

The touch substrate provided by the embodiment of the present disclosure can adopt a self-capacitance principle, i.e., each of the first touch electrode 31 and the second touch electrode 32 is an individual self-capacitance electrode; or the touch substrate provided by the embodiment of the present disclosure can also adopt a mutual capacitance principle, i.e., one of the first touch electrode 31 and the second touch electrode 32 is a touch sensing electrode and the other one of the first touch electrode 31 and the second touch electrode 32 is a touch driving electrode. The first touch electrode 31 and the second touch electrode 32 can adopt common pattern design in the art, and for example, can adopt a common bridge point type touch structure or other touch structures in the art, as long as an effect of arranging the first wire 41 in the touch region can be achieved.

For example, materials of the first touch electrode 31 and the second touch electrode 32 can be transparent conductive metal oxides, e.g., at least one of indium zinc oxide, indium gallium zinc oxide, indium tin oxide, or the like.

Figure 3A:
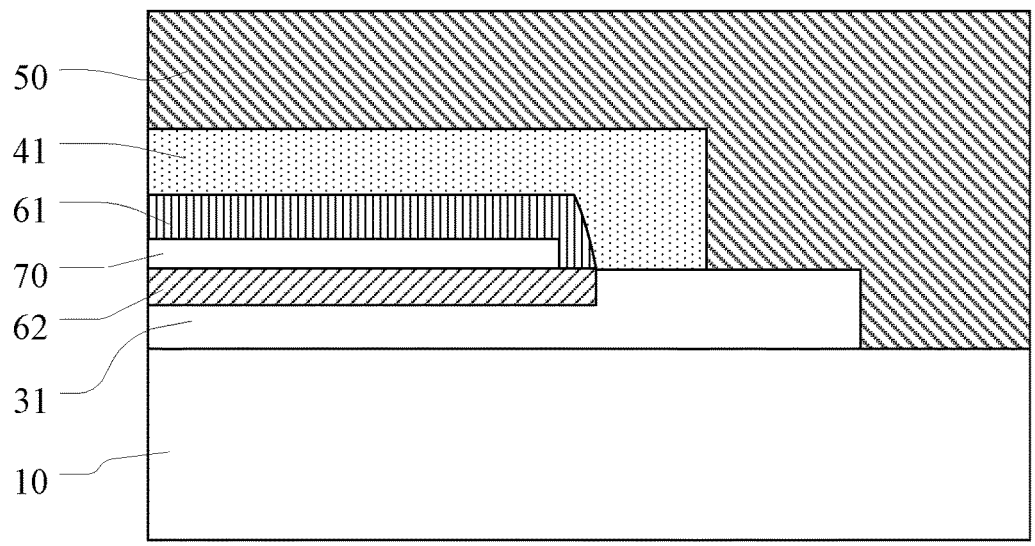
FIG. 3a is a section-view schematic diagram of a touch substrate including a shielding electrode, as provided by an embodiment of the present disclosure.
Figure 3B:
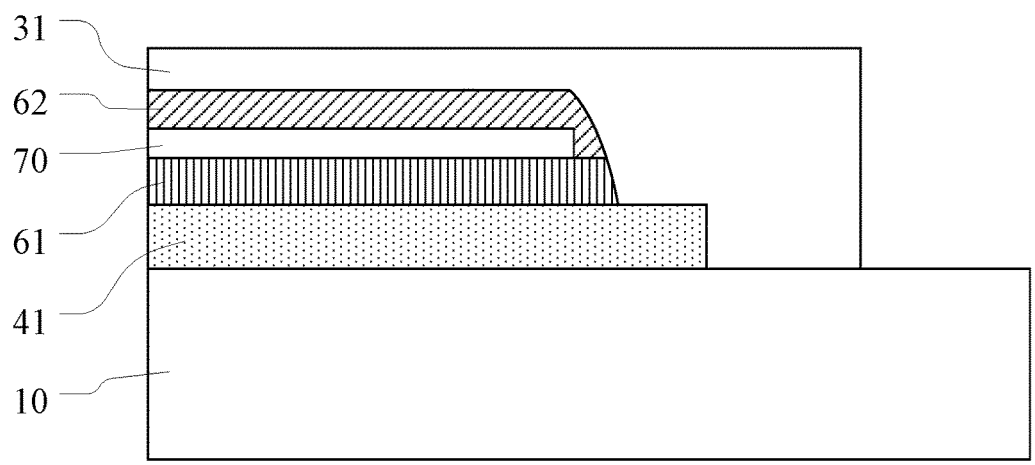
FIG. 3b is a section-view schematic diagram of a touch substrate including a shielding electrode, as provided by an embodiment of the present disclosure.

The first wire 41 extends in the touch region 101, and thus, in order to reduce crosstalk between the first wire 41 and the first/second touch electrodes so as not to influence signal transmission to the greatest extent, for example, a shielding electrode can be arranged between the first wire 41 and the first/second touch electrodes. Namely, as illustrated in FIG. 3a and FIG. 3b, the touch substrate can further include a shielding electrode 70 and a second insulating layer 62, the shielding electrode 70 is arranged on the first side (i.e., the lower end of the first insulating layer 61 in FIG. 3a, and the upper side of the first insulating layer 61 in FIG. 3b) of the first insulating layer 61, an orthogonal projection of the first wire 41 on a plane where the shielding electrode 70 is located and the shielding electrode 70 have an overlapping portion, and the shielding electrode 70 is insulated from the first touch electrode 31 and the second touch electrode 32 by the second insulating layer 62. In the embodiment of the present disclosure, the shielding electrode 70 is floated, i.e., does not need to be electrically connected with other parts.

In a case that the touch substrate includes the shielding electrode 70, for example, a material of at least one of the first insulating layer 61 and the second insulating layer 62 can include an inorganic material, e.g., at least one of materials of SiNxOy (silicon oxynitride), $SiO_2$ (silicon dioxide), or the like. Therefore, at least one of the first insulating layer 61 and the second insulating layer 62 can be formed by silk-screen printing or a similar mode without using the photoetching process which adopts the mask, so that production cost can be effectively reduced.

In FIG. 3a, the first touch electrode 31, the second insulating layer 62, the shielding electrode 70, the first insulating layer 61 and the first wire 41 are sequentially arranged on the base substrate 10 from bottom to top. The case illustrated in FIG. 3a can be used for the OGS touch screen, so that when a touch object (for example, a finger of a person) touches from a side (a lower side of the base substrate 10 in FIG. 3a) of the base substrate 10, which faces away from the first touch electrode 31, the first touch electrode 31 is close to the touch object, and the shielding electrode 70 is far away from the touch object, so that the shielding electrode 70 cannot influence a signal of the first touch electrode 31.

In FIG. 3b, the first touch electrode 31, the second insulating layer 62, the shielding electrode 70, the first insulating layer 61 and the first wire 41 are sequentially arranged on the base substrate 10 from top to bottom. The case illustrated in FIG. 3b can be used for the on cell touch screen, and thus, when a touch object (for example, a finger of a person) touches from a side (an upper side of the first touch electrode 31 in FIG. 3b) of the first touch electrode 31, which faces away from the base substrate 10, the first touch electrode 31 is close to the touch object, and the shielding 70 is far away from the touch object, so that the shielding electrode 70 cannot influence a signal of the first touch electrode 31.

A position relationship between the second touch electrode 32 and the shielding electrode 70 as well as the second insulating layer 62 is similar with that between the first touch electrode 31 and the shielding electrode 70 as well as the second insulating layer 62, and is not repeated herein.

In order to avoid influence on an aperture ratio to the greatest extent, for example, a material of the shielding electrode 70 can include a transparent conductive metal oxide, e.g., indium zinc oxide, indium tin oxide, indium gallium zinc oxide, or the like.

For example, the shielding electrode 70 can be of a continuous planar structure. Therefore, in the process of producing the shielding electrode 70, steps of exposure, development, etching and the like do not need to be carried out, so that a production process of the shielding electrode 70 is simple.

Figure 4A:
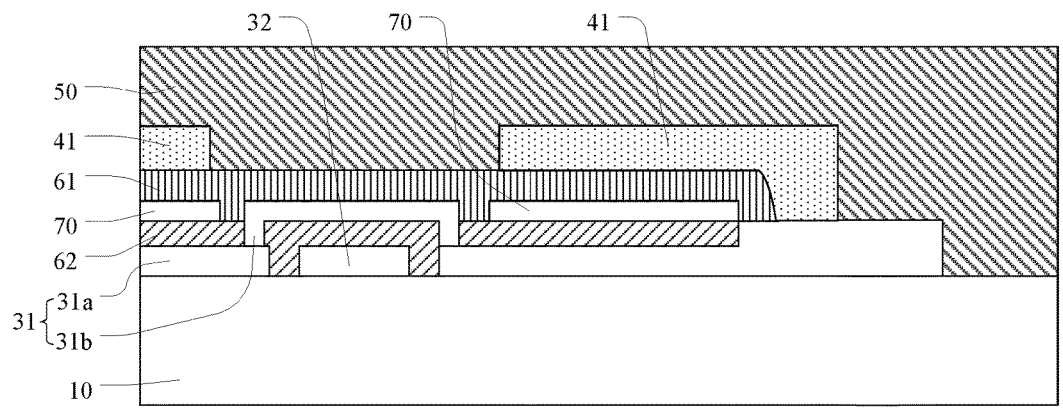
FIG. 4a is a section-view schematic diagram of a touch substrate which includes a shielding electrode disposed on the same layer with connecting portions of a first touch electrode, as provided by an embodiment of the present disclosure.
Figure 4B:
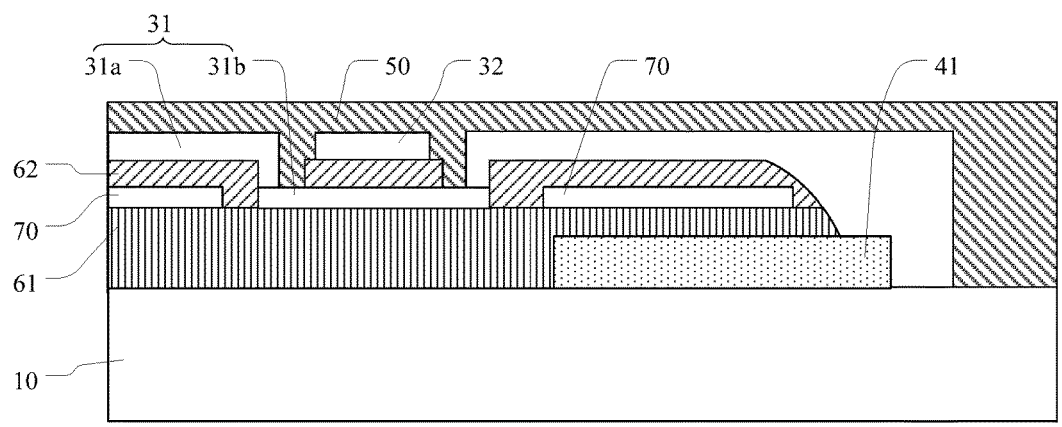
FIG. 4b is a section-view schematic diagram of a touch substrate which includes a shielding electrode disposed on the same layer with connecting portions of a first touch electrode, as provided by an embodiment of the present disclosure.

For example, in order to save the process flow, the shielding electrode 70 can be formed in a step of forming the first touch electrode 31 and the second touch electrode 32. For example, one of the first touch electrode 31 and the second touch electrode 32 includes a plurality of sub-electrodes sequentially arranged and a plurality of connecting portions, the connecting portions and the sub-electrodes are arranged on different layers, and two adjacent sub-electrodes are electrically connected by one connecting portion; and the other one of the first touch electrode 31 and the second touch electrode 32 is continuously formed and is arranged on the same layer with the sub-electrodes. Namely, the first touch electrode 31 and the second touch electrode 32 can adopt the bridge point type touch structure. For example, as illustrated in FIG. 4a and FIG. 4b, the first touch electrode 31 can include a plurality of sub-electrodes 31a and a plurality of connecting portions 31b, and two adjacent sub-electrodes 31a are electrically connected by one connecting portion 31b; the second touch electrode 32 is arranged on the same layer with the sub-electrodes 31a, and is separated from the connecting portions 31b by the insulating layer (for example, the second insulating layer 62). In this case, the shielding electrode 70 can be arranged on a same layer with the connecting portions 31b, i.e., the shielding electrode 70 and the connecting portions 31b can be formed by a same thin film, so that the process flow can be saved. In FIG. 4a and FIG. 4b, illustration is carried out only by taking a case that the second touch electrode 32 is separated from the connecting portions 31b of the first touch electrode 31 by the second insulating layer 62 as an example, and certainly, the second touch electrode 32 can also be separated from the connecting portions 31b of the first touch electrode 31 in a mode of arranging other insulating layer so as to implement mutual insulation of the second touch electrode 32 and the connecting portions 31b of the first touch electrode 31.

FIG. 4a can be applied to the OGS touch screen, and FIG. 4b can be applied to the on cell touch screen. Certainly, the embodiments of the present disclosure include, but are not limited to, the cases illustrated in FIG. 4a and FIG. 4b. Regardless of the case in FIG. 4a or the case in FIG. 4b, for the embodiment of the present disclosure, the first touch electrode and the second touch electrode are arranged on a touch side (a side where a touch operation is carried out) closer to the touch substrate than the first wire and the wiring region wire.

In FIG. 4a and FIG. 4b, the sub-electrodes 31a and conductive bridges 32b of the first touch electrode 31 are electrically connected through a via hole (not illustrated in the drawings) in the insulating layer 62, and in this case, the second insulating layer 62 generally can be made of an organic material, e.g., resin and the like, which can be beneficial for carrying out patterning on the second insulating layer 62 by the photoetching process and the like for example, so that the second insulating layer 62 forms a required pattern.

At least one embodiment of the present disclosure further provides a display device, which includes the touch substrate provided by any one embodiment above.

Figure 5:
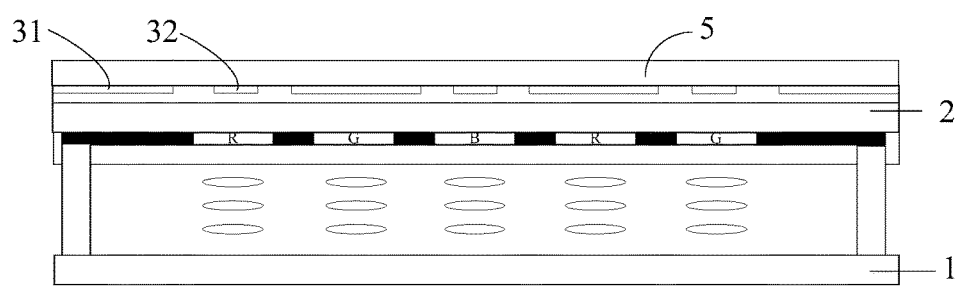
FIG. 5 is a section-view schematic diagram of a display device provided by an embodiment of the present disclosure.

For example, as illustrated in FIG. 5, the display device can include an array substrate 1 and an opposed substrate 2 which are arranged oppositely, or the display device can include an array substrate 1 and an opposed substrate 2 which are arranged oppositely, and a protection substrate 5 arranged on a side of the opposed substrate 2, which faces away from the array substrate 1. In the display device, the opposed substrate 2 can be used as the touch substrate, and the first touch electrode 31, the second touch electrode 32 and the first wire are arranged on the side of the opposed substrate 2, which faces away from the array substrate 1, i.e., the display device adopts an on cell mode; or, as illustrated in FIG. 5, the protection substrate 5 can be used as the touch substrate, and the first touch electrode 31, the second touch electrode 32 and the first wire (not illustrated in FIG. 5) are arranged on the protection substrate 5, i.e., the display device adopts an OGS mode.

For example, the opposed substrate 2 may be a color filter substrate, i.e., for example, a color filter layer including a red filter pattern R, a green filter pattern G and a blue filter pattern B is arranged on the opposed substrate 2; or, the opposed substrate 2 may also be a transparent substrate, i.e., the color filter layer is not arranged on the opposed substrate 2.

The display device provided by the embodiment of the present disclosure can be any product or part with a display function, e.g., a liquid crystal panel, electronic paper, an Organic Light-Emitting Diode (OLED), a mobile phone, a tablet personal computer, a television, a display, a notebook computer, a digital photo frame, a navigator, or the like.

At least one embodiment of the present disclosure further provides a manufacturing method of a touch substrate. As illustrated in FIG. 2a to FIG. 2c, the touch substrate has a touch region 101 and a wiring region 102 positioned outside the touch region 101. The manufacturing method includes a step S11 to a step S13, and the steps will be illustrated in details below.

S11: forming a first touch electrode 31 and a second touch electrode 32 in the touch region 101. In the step, the first touch electrode 31 extends from a first side edge 101a of the touch region 101 to a second side edge 101b of the touch region 101 along a first direction; and the second touch electrode 32 extends from a third side edge 101c of the touch region 101 to a fourth side edge 101d of the touch region 101 along a second direction, the second direction intersects with the first direction, and the wiring region 102 is positioned at the fourth side edge 101d of the touch region 101.

By taking a case that the first touch electrode 31 and the second touch electrode 32 adopt a bridge point type touch structure as an example, formation of the first touch electrode 31 and the second touch electrode 32, for example, can include a step S111 to a step S113, which will be illustrated below in connection with FIG. 4a.

S111: forming a first transparent conductive film, and carrying out patterning process on the first transparent conductive film so as to form a plurality of sub-electrodes 31a of the first touch electrode 31, which are separated from each other, and the second touch electrode 32.

S112: forming a second insulating layer 62 and via holes (not illustrated in FIG. 4a) on the sub-electrodes 31a of the first touch electrode 31 and the second touch electrode 32.

S113: forming a second transparent conductive film on the second insulating layer 62, and carrying out patterning process on the second transparent conductive film so as to form connecting portions 31b of the first touch electrode 31, the connecting portions 31b being electrically connected with the sub-electrodes 31a through the via holes in the second insulating layers 62.

S12: forming a first wire 41 electrically connected with one of the first touch electrode 31 and the second touch electrode 32. In the step, the first wire 41 extends to the fourth side edge 101d of the touch region 101 in the touch region 101 after being led out of a position connected with one of the first touch electrode 31 and the second touch electrode 32, and extends to the wiring region 102 from the fourth side edge 101d.

S13: forming a first insulating layer 61 at least in the touch region 101 between the step S11 of forming the first touch electrode 31 and the second touch electrode 32 and the step S12 of forming the first wire 41. In the step, along a direction perpendicular to a plane where the first insulating layer 61 is located, the first touch electrode 31 and the second touch electrode 32 are formed on a first side of the first insulating layer 61, the first wire 41 is formed on a second side of the first insulating layer 61, and the second side is opposite to the first side.

In the manufacturing method provided by the embodiment of the present disclosure, sequences of the step S11 and the step S12 are not limited. In addition, in the step S12, when the first wire 41 is formed, a wiring region wire 43 can also be synchronously formed.

The wires are arranged in the touch region 101, and thus, in order not to influence signal transmission to the greatest extent, for example, between the step S11 of forming the first touch electrode and the second touch electrode and the step S13 of forming the first insulating layer, the method provided by the embodiment of the present disclosure further can include: forming a second insulating layer and a shielding electrode. In the method, the shielding electrode is formed on the first side of the first insulating layer, an orthogonal projection of the first wire on a plane where the shielding electrode is located and the shielding electrode have an overlapping portion, and the shielding electrode is insulated from the first touch electrode and the second touch electrode by the second insulating layer.

In the manufacturing method provided by the embodiment of the present disclosure, arrangement of each part can refer to description of the same part in the embodiments of the above-mentioned touch substrate, and is not repeated herein.

For example, for the case illustrated in FIG. 3a, after the first touch electrode 31 and the second touch electrode 32 are formed, the manufacturing method of the touch substrate, which is provided by the embodiment of the present disclosure, can further include a step S31 to a step S35, which will be illustrated in details below.

S31: forming one layer of second insulating layer 62 across a whole surface on the first touch electrode 31 and the second touch electrode (not illustrated in FIG. 3a). For example, the second insulating layer 62 can be formed in a silk-screen printing mode, and the second insulating layer 62 can adopt an inorganic material, e.g., silicon oxynitride or the like.

S32: forming one layer of shielding electrode 70 across a whole surface on the second insulating layer 62.

S33: forming the first insulating layer 61 across a whole surface on the shielding electrode 70. For example, the first insulating layer 61 can be formed in a silk-screen printing mode, and the first insulating layer 61 can adopt an inorganic material, e.g., silicon oxynitride or the like.

S34: forming a metal thin film on the first insulating layer 61, carrying out patterning process on the metal thin film to form the first wire 41 and the wiring region wire (not illustrated in FIG. 3a), enabling the first wire 41 to be electrically connected with the first touch electrode 31 and enabling the wiring region wire to be electrically connected with the second touch electrode (not illustrated in FIG. 3a).

S35: forming a protective layer 50 on the first wire 41 and the wiring region wire.

For the touch substrate illustrated in FIG. 3b, the manufacturing method is similar with that of the touch substrate in FIG. 3a, is just different in sequence, and is not repeated herein.

For the case illustrated in FIG. 4a, the manufacturing method of the first touch electrode 31, the second touch electrode 32 and the second insulating layer 62 can adopt the mode in the step S111 to the step S113, and in the step S113, the shielding electrode 70 can also be formed when the connecting portions 31b of the first touch electrode 31 are formed, so that the process steps are saved; and the following steps are similar with the step S33 to the step S35, and are not repeated herein.

For the touch substrate illustrated in FIG. 4b, the manufacturing method is similar with the manufacturing of the touch substrate in FIG. 4a, is just different in sequence, and is not repeated herein.

The foregoing embodiments merely are exemplary embodiments of the disclosure, and not intended to define the scope of the disclosure, and the scope of the disclosure is determined by the appended claims.

The present application claims priority of the Chinese Patent Application No. 201510597496.X filed on Sep. 18, 2015, the disclosure of which are incorporated herein by its reference in its entirety as part of the present application.

The invention claimed is:

1. A touch substrate, having a touch region and a wiring region outside the touch region, and comprising:
   a first touch electrode arranged in the touch region, wherein the first touch electrode extends from a first side edge of the touch region to a second side edge of the touch region along a first direction;
   a second touch electrode arranged in the touch region, wherein the second touch electrode extends from a third side edge of the touch region to a fourth side edge of the touch region along a second direction, the second direction intersects with the first direction, and the wiring region is positioned at the fourth side edge of the touch region, wherein the touch region is a region where the first touch electrode and the second touch electrode are located;
   a first wire, electrically connected with one of the first touch electrode and the second touch electrode, wherein the first wire extends to the fourth side edge of the touch region in the touch region from a position connected with the one of the first touch electrode and the second touch electrode, and extends to the wiring region from the fourth side edge;
   a first insulating layer, at least arranged in the touch region, wherein along a direction perpendicular to a plane where the first insulating layer is located, the first touch electrode and the second touch electrode are arranged on a first side of the first insulating layer, the first wire is arranged on a second side of the first insulating layer, and the second side is opposite to the first side; and
   a shielding electrode, wherein the shielding electrode is arranged on the first side of the first insulating layer, an orthogonal projection of the first wire on a plane where the shielding electrode is located and the shielding electrode have an overlapping portion, and the shielding electrode is provided between the first touch electrode and the first wire.

2. The touch substrate according to claim 1, further comprising a second wire, wherein the second wire is electrically connected with the other one of the first touch electrode and the second touch electrode, and the second wire extends to the fourth side edge of the touch region in the touch region from a position connected with the other one of the first touch electrode and the second touch electrode, and extends to the wiring region from the fourth side edge.

3. The touch substrate according to claim 1, further comprising a wiring region wire, wherein the wiring region wire is electrically connected with the second touch electrode at the fourth side edge, and extends to the wiring region from the fourth side edge.

4. The touch substrate according to claim 1, further comprising:
   a second insulating layer, insulating the shielding electrode from the first touch electrode and the second touch electrode.

5. The touch substrate according to claim 4, wherein the shielding electrode is of a continuous planar structure.

6. The touch substrate according to claim 4, wherein
   one of the first touch electrode and the second touch electrode includes a plurality of sub-electrodes sequentially arranged and a plurality of connecting portions, the plurality of connecting portions and the plurality of sub-electrodes are arranged on different layers, and two adjacent sub-electrodes are electrically connected by one connecting portion; and
   the shielding electrode and the connecting portions are arranged on a same layer.

7. The touch substrate according to claim 4, wherein a material of the shielding electrode includes a transparent conductive metal oxide.

8. The touch substrate according to claim 4, wherein a material of at least one of the first insulating layer and the second insulating layer includes an inorganic material.

9. The touch substrate according to claim 1, wherein a material of the first insulating layer includes an inorganic material.

10. The touch substrate according to claim 1, wherein along the first direction, a size of the touch substrate is equal to a distance between the first side edge and the second side edge.

11. A display device, comprising the touch substrate according to claim 1.

12. The display device according to claim 11, wherein
   the display device includes an array substrate and an opposed substrate which are arranged oppositely,
   the opposed substrate is used as the touch substrate, and the first touch electrode, the second touch electrode and the first wire are arranged on a side of the opposed substrate, which faces away from the array substrate.

13. The display device according to claim 11, wherein the display device includes an array substrate and an opposed substrate which are arranged oppositely, and a protection substrate arranged on a side of the opposed substrate, which faces away from the array substrate,
   the protection substrate is used as the touch substrate, and the first touch electrode, the second touch electrode and the first wire are arranged on the protection substrate.

14. A manufacturing method of a touch substrate, wherein the touch substrate has a touch region and a wiring region outside the touch region, the method comprising:
   forming a first touch electrode and a second touch electrode in the touch region, wherein the first touch electrode extends from a first side edge of the touch region to a second side edge of the touch region along a first direction, the second touch electrode extends from a third side edge of the touch region to a fourth side edge of the touch region along a second direction, the second direction intersects with the first direction, and the wiring region is positioned at the fourth side edge of the touch region, wherein the touch region is a region where the first touch electrode and the second touch electrode are located;
   forming a wire electrically connected with one of the first touch electrode and the second touch electrode, wherein the wire extends to the fourth side edge of the touch region in the touch region from a position connected with the one of the first touch electrode and the second touch electrode, and extends to the wiring region from the fourth side edge; and forming a first insulating layer at least in the touch region between forming the first touch electrode and the second touch electrode and forming the wire, wherein along a direction perpendicular to a plane where the first insulating layer is located, the first touch electrode and the second touch electrode are formed on a first side of the first insulating layer, the wire is formed on a second side of the first insulating layer, and the second side is opposite to the first side, wherein the method further comprises forming a shielding electrode between forming the first touch electrode and the second touch electrode and forming the first insulating layer, and wherein the shielding electrode is formed on the first side of the first insulating layer, an orthogonal projection of the wire on a plane where the shielding electrode is located and the shielding electrode have an overlapping portion and the shielding electrode is provided between the first touch electrode and the first wire.

15. The method according to claim 14, further comprising: forming a second insulating layer between forming the first touch electrode and the second touch electrode and forming the first insulating layer, wherein the second insulating layer insulates the shielding electrode from the first touch electrode and the second touch electrode.

\* \* \* \* \*